Patented Feb. 2, 1937

2,069,388

UNITED STATES PATENT OFFICE 2,069,388

PROCESS OF MANUFACTURING A FOOD PRODUCT

David D. Peebles, Eureka, Calif.

No Drawing. Application April 13, 1932, Serial No. 605,119

3 Claims. (Cl. 99—11)

This invention relates generally to food products, such as are valuable as a poultry or stock feed, and to processes or methods for manufacturing the same.

It has previously been proposed to form food products of high nutritive value by intermixing certain vegetable material with milk or milk products. Many problems are encountered in the manufacture of such products. Certain desirable components of vegetable origin, particularly vitamine A, are highly unstable, due to susceptibility to oxidation and other complex factors.

Furthermore if desiccation is attempted by ordinary methods, a material is obtained which is highly hygroscopic, particularly when the product contains milk sugar.

It is an object of the present invention to devise a food product of the above character in which certain ingredients, particularly vitamine A, are stabilized more effectively than as has been heretofore possible. In this connection the vitamine A content of my product is stabilized by its intimate association with milk sugar, and also by the presence of sufficient vegetable chlorophyl to protect it from the disintegrating effect of light.

It is a further object of the invention to devise a highly nutritive food product which is substantially non-hygroscopic, although in divided form.

Further objects of the invention will appear from the following description in which the preferred embodiments of the invention are set forth in detail. It is to be understood that the appended claims are to be accorded a range of equivalents consistent with the state of the prior art.

The nature of my product can best be understood after a detailed explanation of the preferred method for its manufacture. The chief ingredients utilized are a milk product containing substantial quantities of milk sugar, as for example whey, and a fresh vegetable rich in vitamine A and vegetable chlorophyl. Fresh spinach and alfalfa have proven satisfactory.

Assuming that whey and spinach are to be utilized, the first step is to reduce the fresh spinach to finely divided form, by rubbing and grinding to crush the cell structure. In carrying out this step apparatus such as is commonly known as a burr or attrition mill, can be utilized. The whey is preconcentrated by means of a suitable evaporator or preconcentrator, to say from 20 to 50% solids. The finely divided spinach is then fed upon a vibrating or shaking screen, and at the same time the preconcentrated whey is sprayed upon the screen into contact with the spinach. The whey, together with the finer solids of the divided spinach pass thru the screen, while heavier fibers are retained by the screen.

The material which passes thru the screen, which goes to make up the main product of this invention, takes on a deep greenish color. This color is not due to the presence of green vegetable particles, but is due to the fact that chlorophyl in the vegetable is actually absorbed by the preconcentrated whey. If vegetable fibers were removed from this material, they would be found to have substantially no color. Likewise in addition to the extraction of chlorophyl from the vegetable, the vitamine A content of the vegetable is likewise absorbed by the whey. This resulting material, which is still in fluid form, is then passed thru a suitable spray type desiccator and reduced to a dry powder.

The product when manufactured as outlined above is highly hygroscopic, due to the fact that the milk sugar is in anhydrous form. To complete a commercial product, I therefore treat the dry powder resulting from the step of desiccation to convert the same to a stabilized nonhygroscopic divided material. A suitable process to effect this result is disclosed in my copending application No. 458,984, filed June 2, 1930, entitled Method and apparatus for manufacturing lactose containing materials. To briefly review this stabilizing process, the material for example is placed within a drum which is rotated while a controlled amount of water is added, the rotation of the drum maintaining the material in suspension and in divided form. Rotation of the drum is followed by a period of quiescence to permit complete conversion of the milk sugar to the monohydrate form. The milk sugar of a properly converted product contains about 5.3% water, as water of crystallization, while a certain small amount of water is also present in the remainder of the solids.

The complete stabilized product is somewhat denser than the product from the spray desiccator due to the crystallization which has taken place. The green color of the crystals protects the vitamine A content from the disintegrating effect of light, and at the same time the vitamine A content is stabilized due to its intimate association with milk sugar. Direct oxidation of the vitamine A content when the product is exposed to the air is minimized as the crystalline masses are considerably larger than the particles of the material delivered from the desiccator. The vitamine A content of the complete product is obviously considerably greater than the vitamine A content of ordinary milk or of whole whey.

I claim:

1. In a method of manufacturing a food product containing milk sugar, the steps of spraying a liquid material containing milk sugar upon a mass of crushed fresh vegetable like spinach, permitting the liquid material to percolate thru the mass whereby vegetable coloring matter and vitamine ingredients are extracted from the vegetable, and then spray drying the resulting liquid material and then converting the dried mass to a non-hygroscopic powder in which the milk sugar is crystallized.

2. In a method of manufacturing a food product containing milk sugar, the steps of applying a liquid material containing milk sugar upon a mass of crushed fresh vegetable like spinach, permitting the liquid material to percolate through the mass whereby vegetable coloring matter and vitamin ingredients are extracted from the vegetable, and then reducing the moisture content of the liquid material and converting the same to a non-hygroscopic powder in which the milk sugar is crystallized.

3. In a method of manufacturing a food product containing milk sugar, the steps of leaching a crushed fresh vegetable like spinach with a liquid lacteal material containing lactose, whereby the liquid material extracts vegetable coloring matter and vitamin ingredients from the vegetable withdrawing the liquid material apart from heavier leached fiber, and then reducing the moisture content of the liquid material to form an ostensibly dry and non-hygroscopic divided product in which the lactose content is crystallized.

DAVID D. PEEBLES.